United States Patent
Nejah

(10) Patent No.: US 7,620,035 B2
(45) Date of Patent: Nov. 17, 2009

(54) VOICE-OVER-IP DEVICE USING DIAL-UP MODEM

(75) Inventor: Allen Nejah, San Jose, CA (US)

(73) Assignee: SunMan Engineering, Inc., San Jose, CA (US)

( * ) Notice: Subject to any disclaimer, the term of this patent is extended or adjusted under 35 U.S.C. 154(b) by 948 days.

(21) Appl. No.: 11/077,261

(22) Filed: Mar. 9, 2005

(65) Prior Publication Data

US 2006/0203800 A1 Sep. 14, 2006

(51) Int. Cl.
*H04L 12/66* (2006.01)
(52) U.S. Cl. .................. 370/352; 370/467; 370/468
(58) Field of Classification Search .................. 370/352
See application file for complete search history.

(56) References Cited

U.S. PATENT DOCUMENTS

| 6,459,783 | B1 | 10/2002 | March et al. |
| 6,763,020 | B1 | 7/2004 | Hon |
| 6,950,441 | B1 | 9/2005 | Kaczmarczyk et al. |
| 2004/0105432 | A1 * | 6/2004 | Yamaji ........................ 370/352 |
| 2005/0076149 | A1 * | 4/2005 | McKown et al. ............ 709/249 |
| 2005/0135598 | A1 | 6/2005 | Badt, Jr. et al. |
| 2005/0249117 | A1 * | 11/2005 | Gerkins ...................... 370/230 |

OTHER PUBLICATIONS

"Ag1170 +5V / +3.3V Low Power Ringing SLIC," Silver Telecom Products Data Sheet, V1.5 Aug. 2004, pp. 1-15.
Bill Goodman et al., "Internet Telephony and Modem Delay," IEEE Networks, May/Jun. 1999, pp. 8-16.

\* cited by examiner

*Primary Examiner*—Creighton Smith
(74) *Attorney, Agent, or Firm*—Patent Law Group LLP; David C. Hsia

(57) ABSTRACT

A network telephone device includes a subscriber line/loop interface circuit (SLIC) for coupling to an analog telephone, a telephony processor coupled to the SLIC, and a dial-up modem coupled to the telephony processor. The telephony processor converts outgoing telephone signals from the SLIC into outgoing data packets, and incoming data packets into incoming telephone signals to the SLIC. The dial-up modem converts the outgoing data packets from the telephony processor into outgoing modem signals, and incoming modem signals to the incoming data packets to the telephony processor.

18 Claims, 2 Drawing Sheets

VOICE-OVER-IP DEVICE USING DIAL-UP MODEM

FIELD OF INVENTION

This invention relates to VoIP (Voice over Internet Protocol) telephone devices and services.

DESCRIPTION OF RELATED ART

There are many VoIP service providers, such as AT&T, Vonage, Lingo, BroadVoice, and Packet8. FIG. 1 illustrates a typical setup 100 available from these service providers. An analog telephone adapter (ATA) 102 is provided to the customer. ATA 102 has an RJ-11 phone port connected to an analog telephone 104. ATA 102 also has an RJ-45 network port connected to a router 106. Router 106 has RJ-45 network ports connected a personal computer 108 and a broadband modem 120 (e.g., a cable or a DSL modem). Broadband modem 120 is coupled through a network 122 (e.g., the Internet) to the network telephone service provider 124.

VoIP uses packet switching to open a brief connection to send the data necessary for the telephone conversation. VoIP allows several telephone calls to occupy the amount of space occupied by only one in a circuit-switched network.

BRIEF DESCRIPTION OF THE DRAWINGS

Use of the same reference numbers in different figures indicates similar or identical elements.

SUMMARY

In one embodiment of the invention, a network telephone device includes a subscriber line/loop interface circuit (SLIC) for coupling to an analog telephone, a telephony processor coupled to the SLIC, and a dial-up modem coupled to the telephony processor. The telephony processor converts outgoing telephone signals from the SLIC into outgoing data packets, and incoming data packets into incoming telephone signals to the SLIC. The dial-up modem converts the outgoing data packets from the telephony processor into outgoing modem signals, and incoming modem signals to the incoming data packets to the telephony processor.

DETAILED DESCRIPTION

VoIP (Voice over Internet Protocol) service providers require their customers to have broadband Internet access. However, many consumers cannot afford broadband Internet access. Furthermore, major telecommunication carriers have underutilized modem banks left over from the early days of the Internet where dial-up was the dominant way of accessing the Internet. Thus, a device and a method are provided in accordance with the invention to take advantage of the efficiency of VoIP telephony and the abundance of traditional dial-up connection to the Internet.

Figure 1:
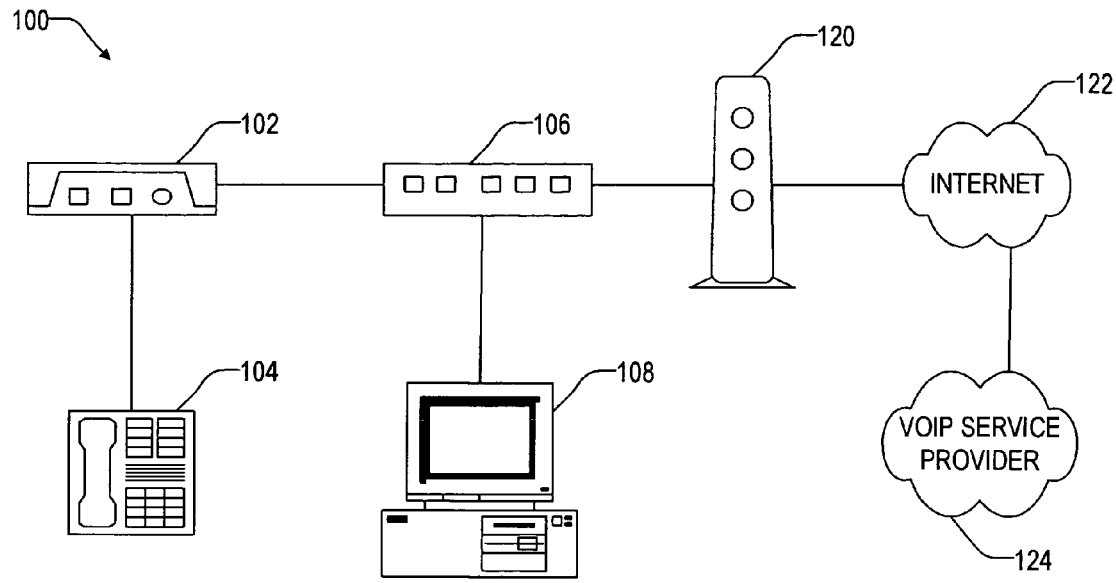
FIG. 1 illustrates a prior art network telephone system.
Figure 2:
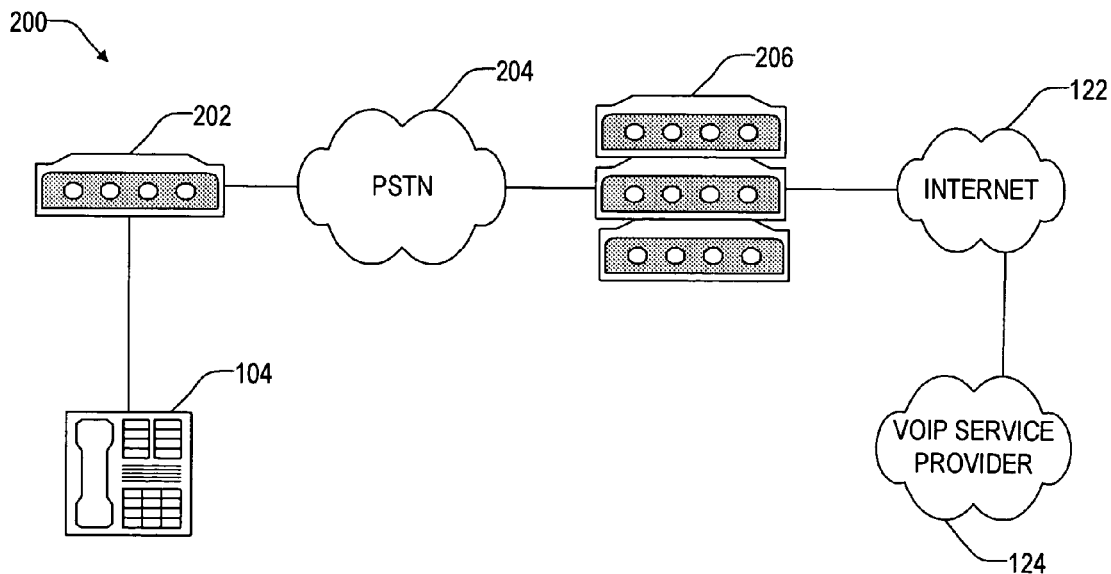
FIG. 2 illustrates a network telephone system in one embodiment of the present invention.

FIG. 2 illustrates a setup of a network telephone system 200 in one embodiment of the invention. System 200 includes a network telephone device 202 with one phone port connected to analog telephone 104 and another phone port connected to a public switching telephone network (PSTN) 204. Device 202 uses an internal dial-up modem to connect to a modem bank 206. Modem bank 206 then connects device 202 to VoIP service provider 124. The connection may be direct if modem bank 206 and VoIP service provider 124 are a single entity. If they are separate entities, then modem bank 206 connects device 202 through a network 122 (e.g., the Internet) to VoIP service provider 124.

To initiate a call, the user dials telephone 104 like any regular telephone. Device 202 takes the telephone number and sets up the telephone call through a dial-up connection to VoIP service provider 124. For the outgoing voice stream, device 202 compresses the voice stream, converts it into data packets, and sends the data packets by the dial-up connection. The data packets can be sent to VoIP service provider 124 or directly to the other party on the telephone call. For the incoming voice stream, device 202 receives the data packets through the dial-up connection, converts it to compressed voice data, and reverts the compressed voice data to the incoming voice stream.

When a call is received, device 202 first determines if the incoming call is a plain old telephone service (POTS) call or a VoIP call. If the incoming call is a POTS call, device 202 routes the call to analog telephone 104. If the incoming call is a VoIP call through a dial-up connection with VoIP service provider 124, device 202 handles the incoming and the outgoing voice streams as described above.

Figure 3:
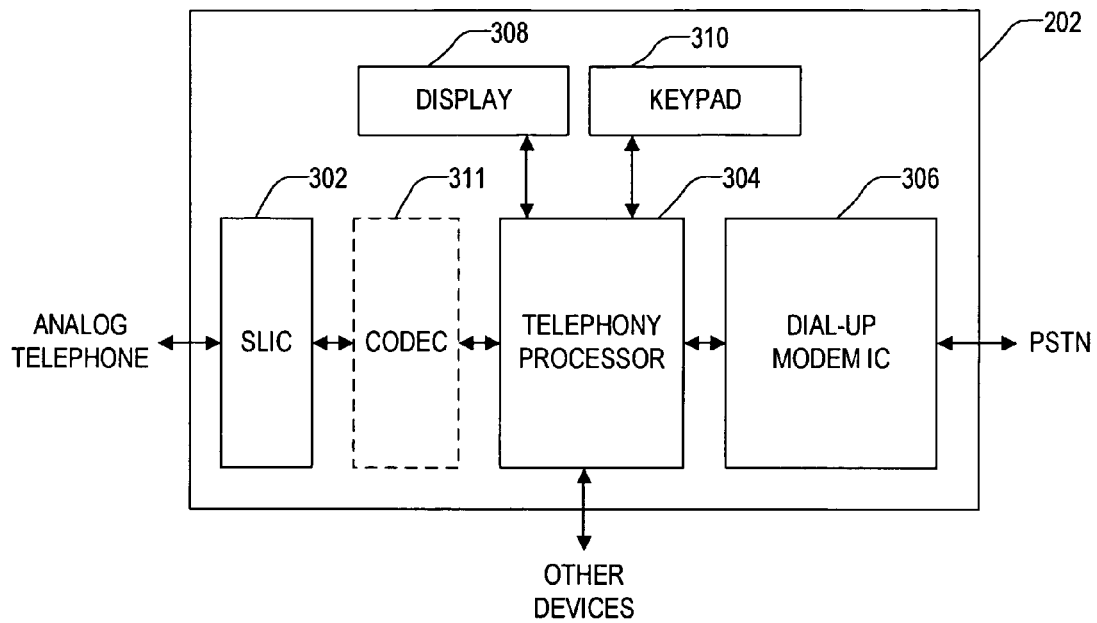
FIG. 3 illustrates a network telephone device in the system of FIG. 2 in one embodiment of the invention.

FIG. 3 illustrates a network telephone device 202 in one embodiment of the invention. Device 202 includes a subscriber line/loop interface circuit (SLIC) 302, a telephony processor 304 coupled to SLIC 302, and a dial-up modem 306 coupled to telephony processor 304. SLIC 302 further has a standard telephone port for connecting to analog telephone 104. In one embodiment, analog telephone 104 is integrated into device 202. Dial-up modem 306 further has a standard telephone port for connecting to PSTN 204. Telephony processor 304 further has ports for connecting to a display 308, a keypad 310, and other devices.

SLIC 302 converts 2-wire analog telephone signals from analog telephone 104 to outgoing 4-wire analog telephone signals destined for telephony processor 304. Vice versa, SLIC 302 converts incoming 4-wire analog telephone signals to the 2-wire analog telephone signals destined for analog telephone 104. SLIC 302 also provides other functions including battery feed, off-hook detection, and ringing for analog telephone 104. In one embodiment, SLIC 302 is an AG1170 from Silver Telecom of West Wales, United Kingdom.

In one embodiment, a coder-decoder (CODEC) 311 is coupled between SLIC 302 and telephony processor 304 to converts the outgoing 4-wire analog telephone signals from SLIC 302 to an outgoing digital audio stream destined for telephony processor 304. Vice versa, CODEC 311 converts an incoming digital audio stream from telephony processor 304 into the incoming 4-wire analog telephone signals. Alternatively, CODEC 311 is incorporated into telephony processor 304.

Telephony processor 304 converts the outgoing digital telephone signals from SLIC 302 into outgoing data packets destined for dial-up modem 306. Vice versa, telephony processor 304 converts incoming data packets from dial-up modem 306 into the incoming digital telephone signals destined for SLIC 302. Telephony processor 304 also performs voice compression, and calling processing and signaling according to the protocol accepted by VoIP service provider 124. In one embodiment, telephony processor 304 is a TNETV1050/1055 from Texas Instrument of Dallas, Tex.

Dial-up modem 306 converts the outgoing data packets into outgoing modem signals destined for modem bank 206. Vice versa, dial-up modem 306 converts incoming modem signals from modem bank 206 into the incoming data packets destined for telephony processor 304. Typically, dial-up modem 306 communicates at a speed of 56 kilobits per second (kbps). In one embodiment, dial-up modem 306 is a CX86500 from Conexant of Newport Beach, Calif.

Figure 4:
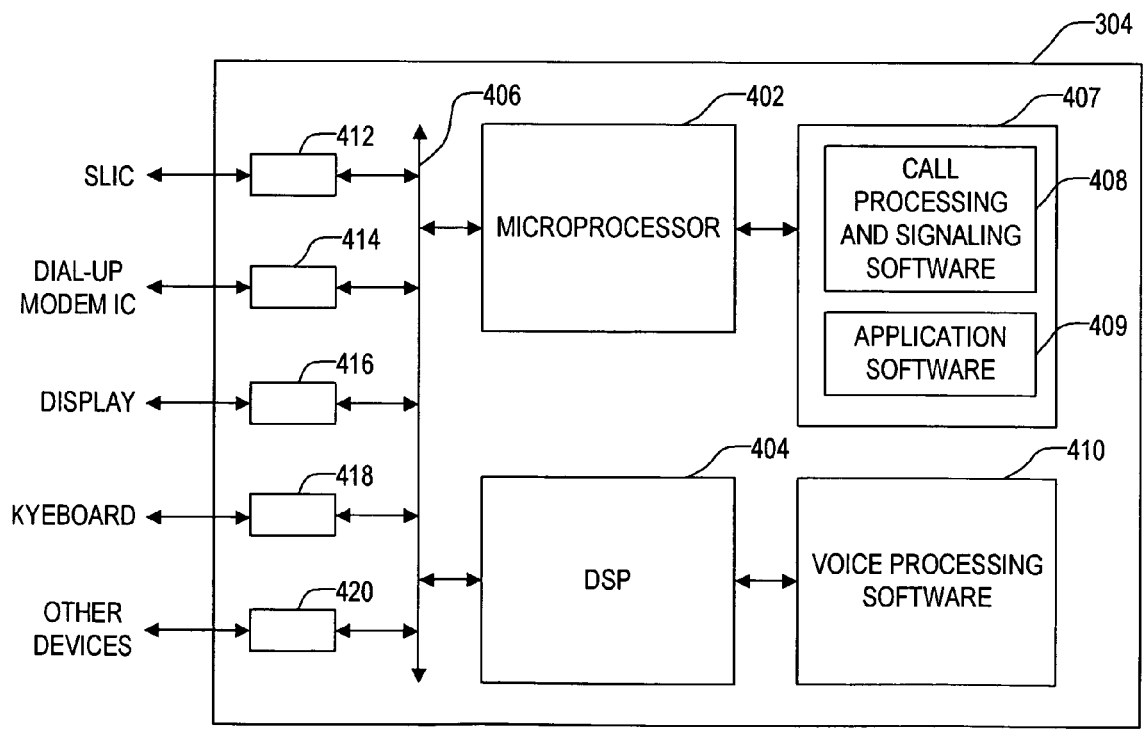
FIG. 4 illustrates a telephony processor in the network telephone device of FIG. 3 in one embodiment of the invention.

FIG. 4 illustrates telephony processor 304 in one embodiment of the invention. Processor 304 includes a microprocessor 402 and a digital signal processor (DSP) 404 connected by a system bus 406.

Microprocessor 402 is connected to a memory 407 that stores call processing and signaling software 408 and optional application software 409. Call processing and signaling software 408 handles standard VoIP protocols, such as H.323, H.323, and SIP. Optional application software 409 include a web browser, an email application, a photo sharing application, an instant messenger, and an Internet radio. Optional application software 409 further include a data service application that provides access to news, music downloads, weather, traffic, flight schedules, recipes, coupons, and stock quotes.

DSP 404 is connected to a memory 410 that stores voice processing software. The voice processing software handles voice compression using a standard CODEC such as G.729a.

System bus 406 is connected to a serial interface 412 for SLIC 302, a serial interface 414 for dial-up modem 306, a display controller 416 for display 308, a keypad interface 418 for keypad 310, and one or more interfaces 420 for other devices. In one embodiment, one interface 420 is a USB port for coupling to additional memory or peripheral devices (e.g., a digital camera). In one embodiment, one interface 420 is an Ethernet port for coupling to additional network telephone devices 202 to share the same dial-up connection.

To use network telephone device 202, the user simply plugs his or her analog telephone 104 to device 202, and device 202 to his or her telephone wall jack. Once turned on, device 202 determines a local access number to modem bank 206. Thereafter, device 202 is ready to dial modem bank 206 to initiate a VoIP telephone call and otherwise receive a VoIP telephone call from modem bank 206.

To initiate a VoIP call, the user dials a telephone number using analog telephone 104. The user can manually set the telephone call as a VoIP telephone call or telephony processor 304 can automatically detect the telephone call as a VoIP telephone call from the telephone number (e.g., when the telephone call is outside of the toll-free calling area of the user). Telephony processor 304 intercepts the telephone number and instructs dial-up modem 306 to connect to modem bank 206.

When connecting to modem bank 206, dial-up modem 306 bypasses the normal modem handshaking that determines the appropriate connection speed. This is because both modem 306 and modem bank 206 are preconfigured to operate at their highest speed (e.g., 56 kbps). Dial-up modem 306 may take additional steps to reduce the connection delay to modem bank 206 as described in "Internet Telephony and Modem Delay" by Bill Goodman, IEEE Network, May/June 1999. These steps help to provide a more enjoyable calling experience with minimum delay between dialing the telephone number and completing the VoIP call setup.

Once connected, telephony processor 304 accesses VoIP service provider 124 to set up the VoIP telephone call according to the predetermined VoIP protocol. Once the two ends of the VoIP telephone call have been established, telephony processor 304 starts transmitting and receiving the VoIP data packets.

As described above, SLIC 302 converts outgoing analog telephone signals from analog telephone 104 into outgoing digital telephone signals destined for telephony processor 304. Telephony processor 304 compresses the digital telephone signals and then converts the compressed data into outgoing data packets destined for dial-up modem 306. Dial-up modem 306 converts the outgoing data packets into outgoing modem signals destined for modem bank 206. Dial-up modem 306 then sends the outgoing modem signals over PSTN 204 to modem bank 206, which then reverts the outgoing modem signals back to the outgoing data packets. Depending on the VoIP protocol, modem bank 206 routes the outgoing data packets to VoIP service provider 124 or directly to the other party on the VoIP telephone call through network 122.

At the same time, dial-up modem 306 converts incoming modem signals from modem bank 206 into incoming data packets destined for telephony processor 304. Telephony processor 304 converts the incoming data packets into compressed data and then reverts the compressed data back to incoming digital telephone signals destined for SLIC 302. SLIC 302 then converts the incoming digital telephone signals to incoming analog telephone signals destined for analog telephone 104.

To receive a call, dial-up modem 306 intercepts the incoming call and determines if it is a POTS call or a VoIP call from modem bank 206. If the call is a POTS call, telephony processor 304 is bypassed and the call is routed through SLIC 302 to analog telephone 104. If the call is a VoIP call through a dial-up connection with VoIP service provider 124, telephony processor 304 handles the call setup and then processes the incoming and outgoing streams as described above.

Along with voice streams, device 202 can also transmit and receive data streams. This is because the voice streams will only consume part of the bandwidth of dial-up modem 306. In one embodiment, the voice streams consume 24 to 30 kbps so that 9 to 19.2 kbps is available for data streams in a 33.2 to 56 kbps dial-up modem.

As described above, microprocessor 402 in device 202 may execute optional application software 409. Optional application software 409 include a web browser, an email application, a photo sharing application, an instant messenger, and an Internet radio. Thus, the data packets being transmitted between device 202 and modem bank 206 may include web pages, emails, images, instant messages, and music streams. Furthermore, optional application software 409 include a data service application that provides access to news, music downloads, weather, traffic, flight schedules, recipes, coupons, and stock quotes on network 122. Thus, the data packets being transmitted between device 202 and modem bank 206 may include news, music, weather report, traffic report, flight schedules, recipes, coupons, and stock quotes. The user can view these data items on display 308. The user can interact with optional application software 409 using keypad 310.

Various other adaptations and combinations of features of the embodiments disclosed are within the scope of the invention. Numerous embodiments are encompassed by the following claims.

What is claimed is:

1. A network telephone device, comprising:
  a subscriber line/loop interface circuit (SLIC) for coupling to an analog telephone;
  a telephony processor coupled to the SLIC, the telephony processor converting outgoing telephone signals from the SLIC into outgoing data packets, the telephony processor further converting incoming data packets into incoming telephone signals to the SLIC, wherein the telephony processor comprises a microprocessor and a digital signal processor (DSP), the microprocessor handing call setup, the DSP handling voice compression; and a dial-up modem coupled to the telephony processor, the dial-up modem converting the outgoing data packets from the telephony processor into outgoing modem signals, the dial-up modem further converting incoming modem signals to the incoming data packets to the telephony processor.

2. The device of claim 1, wherein the microprocessor comprises a memory storing call setup software and the DSP comprises another memory storing voice compression software.

3. The device of claim 1, further comprising a coder-decoder (CODEC) between the SLIC and the telephony processor, wherein:

the SLIC converts analog 2-wire signals from the analog telephone to outgoing analog 4-wire signals for the CODEC and the CODEC converts the outgoing analog 4-wire signals to an outgoing digital audio stream for the telephony processor; and the CODEC converts an incoming digital audio stream from the telephony processor to incoming analog 4-wire signals for the SLIC and the SLIC converts the incoming analog 4-wire signals to the analog 2-wire signals to the analog telephone.

4. The device of claim 1, further comprising a network port for coupling to another network telephone device.

5. The device of claim 1, further including the analog telephone.

6. A network telephone device, comprising:

a subscriber line/loop interface circuit (SLIC) for coupling to an analog telephone;

a telephony processor coupled to the SLIC, the telephony processor converting outgoing telephone signals from the SLIC into outgoing data packets, the telephony processor further converting incoming data packets into incoming telephone signals to the SLC and an item selected from the group consisting of an email, an image, an instant message, a music file, and a music stream, a weather report, a traffic report, a flight schedule, a recipe, a coupon, and a stock quote; and a dial-up modem coupled to the telephony processor, the dial-up modem converting the outgoing data packets from the telephony processor into outgoing modem signals, the dial-up modem further converting incoming modem signals to the incoming data packets to the telephony processor.

7. The device of claim 6, further comprising a display coupled to the telephony processor for displaying the item.

8. The device of claim 6, wherein the telephony processor further includes an other item in the outgoing data packets, the other item being selected from the group consisting of an email, an image, and an instant message.

9. The device of claim 8, further comprising a keypad coupled to the telephony processor, wherein the keypad is used to create the other item.

10. A method for providing a telephone call through a network telephone service provider, comprising:

converting 2-wire analog telephone signals into outgoing 4-wire analog telephone signals;

converting the outgoing 4-wire analog telephone signals into an outgoing digital audio stream;

converting the outgoing digital audio stream into outgoing data packets;

converting the outgoing data packets into outgoing modem signals;

transmitting the outgoing modem signals to a modem bank at a transmission speed without any handshaking to determine the transmission speed;

converting incoming modem signals into incoming data packets;

converting the incoming data packets into an incoming digital audio stream;

converting the incoming digital audio stream into incoming 4-wire analog telephone signals; and converting the incoming 4-wire analog telephone signals to the 2-wire analog telephone signals.

11. The method of claim 10, wherein said converting the outgoing digital audio stream into outgoing data packets comprises compressing voice signals.

12. The method of claim 10, further comprising setting up the telephone call with the network telephone service provider.

13. The method of claim 10, wherein the modem bank converts the outgoing modem signals to the outgoing data packets and routes the outgoing data packets to the network telephone service provider.

14. The method of claim 10, wherein the modem bank converts the outgoing modem signals to the outgoing data packets and routes the outgoing data packets to another party on the telephone call.

15. The method of claim 10, wherein the modem bank receives the incoming data packets from the network telephone service provider and converts the incoming data packets to the incoming modem signals.

16. A method for providing a telephone call through a network telephone service provider, comprising:

converting 2-wire analog telephone signals into outgoing 4-wire analog telephone signals;

converting the outgoing 4-wire analog telephone signals into an outgoing digital audio stream;

converting the outgoing digital audio stream into outgoing data packets;

converting the outgoing data packets into outgoing modem signals;

converting incoming modem signals into incoming data packets;

converting the incoming data packets into an incoming digital audio stream and an item selected from the group consisting of an email, an image, an instant message, a music file, and a music stream, a weather report, a traffic report, a flight schedule, a recipe, a coupon, and a stock quote;

converting the incoming digital audio stream into incoming 4-wire analog telephone signals; and converting the incoming 4-wire analog telephone signals to the 2-wire analog telephone signals.

17. The method of claim 16, further comprising displaying the item.

18. The method of claim 16, further comprising including an other item in the outgoing data packets, the other item being selected from the group consisting of an email, an image, and an instant message.

* * * * *